US012563270B2

(12) United States Patent
Sanghavi et al.

(10) Patent No.:  US 12,563,270 B2
(45) Date of Patent:       Feb. 24, 2026

(54) RENDERING A DYNAMIC ENDEMIC BANNER ON STREAMING PLATFORMS USING CONTENT RECOMMENDATION SYSTEMS AND CONTENT MODELING FOR USER EXPLORATION AND AWARENESS

(71) Applicant: ROKU, INC., San Jose, CA (US)

(72) Inventors: Mehul Sanghavi, San Jose, CA (US);
Rohit Mahto, San Jose, CA (US);
Kelly Lee, Fullerton, CA (US);
Madhulika Taneja, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/932,796

(22) Filed: Oct. 31, 2024

(65) Prior Publication Data

US 2025/0063232 A1      Feb. 20, 2025

Related U.S. Application Data

(63) Continuation of application No. 18/536,627, filed on Dec. 12, 2023, now Pat. No. 12,200,310, which is a
(Continued)

(51) Int. Cl.
*H04N 21/482*         (2011.01)
*H04N 21/466*         (2011.01)

(52) U.S. Cl.
CPC ..... *H04N 21/4826* (2013.01); *H04N 21/4668* (2013.01)

(58) Field of Classification Search
CPC ........... H04N 21/4826; H04N 21/4668; H04N 21/4532; H04N 21/25891; H04N 21/47;
(Continued)

(56) References Cited

U.S. PATENT DOCUMENTS 8,725,559 B1      5/2014   Kothari et al.
9,299,331 B1 *    3/2016   Durham .................. G06F 16/68
(Continued)

FOREIGN PATENT DOCUMENTS

EP            2817970 B1    12/2022
EP           21817970 B1    12/2022
WO      WO-2013126589 A1     8/2013

OTHER PUBLICATIONS

Xiang, B. et al. "*Research of Mobile Recommendation System Based on Hybrid Recommendation Technology*," 3rd International Conference on Consumer Electronics, Communications and Networks, IEEE, Nov. 20, 2013, 5 pages.
(Continued)

*Primary Examiner* — Cynthia M Fogg
(74) *Attorney, Agent, or Firm* — Sterne, Kessler, Goldstein & Fox P.L.L.C.

(57)                  ABSTRACT

Disclosed herein are system, apparatus, article of manufacture, method and/or computer program product embodiments, and/or combinations and sub-combinations thereof, for utilizing a content recommendation system powering a streaming media publisher channel to enhance an ad creative being shown to the user via awareness or performance campaigns. This method allows the platform to present exploratory personalized in-channel content to the publisher platform users in endemic banners that run on the platform which then correspondingly helps drive user reach. An example embodiment operates by implementing personalized content banners that may act as a hook for channel users opening their streaming device, both active and lapsed, to enter back into the channel.

20 Claims, 10 Drawing Sheets

Related U.S. Application Data continuation of application No. 17/882,184, filed on Aug. 5, 2022, now Pat. No. 11,895,372.

(58) Field of Classification Search

CPC .......... H04N 21/251; H04N 21/47202; H04N 21/812

USPC ......................................................... 725/46

See application file for complete search history.

(56) References Cited

U.S. PATENT DOCUMENTS

| | | | |
|---|---|---|---|
| 11,838,592 B1 | 12/2023 | Sanghavi et al. | |
| 11,895,372 B1 | 2/2024 | Sanghavi et al. | |
| 2003/0001846 A1 | 1/2003 | Davis et al. | |
| 2008/0276270 A1 | 11/2008 | Kotaru et al. | |
| 2009/0037279 A1 | 2/2009 | Chockalingam et al. | |
| 2010/0088406 A1 | 4/2010 | Yu et al. | |
| 2010/0318544 A1 | 12/2010 | Nicolov | |
| 2011/0052012 A1 | 3/2011 | Bambha et al. | |
| 2011/0082824 A1 | 4/2011 | Allison et al. | |
| 2011/0208852 A1 | 8/2011 | Looney et al. | |
| 2014/0195345 A1 | 7/2014 | Lyren | |
| 2014/0297739 A1 | 10/2014 | Stein et al. | |
| 2015/0105145 A1 | 4/2015 | Scheer | |
| 2016/0007065 A1 | 1/2016 | Peles et al. | |
| 2016/0092935 A1 | 3/2016 | Bradley et al. | |
| 2016/0127783 A1 | 5/2016 | Garcia Navarro | |
| 2016/0247189 A1 | 8/2016 | Shirley et al. | |
| 2016/0299906 A1 | 10/2016 | Cartoon et al. | |
| 2017/0031920 A1 | 2/2017 | Manning et al. | |
| 2017/0061528 A1 | 3/2017 | Arora et al. | |
| 2017/0091817 A1 | 3/2017 | Lenhart et al. | |
| 2017/0243244 A1* | 8/2017 | Trabelsi | G06Q 30/0255 |
| 2017/0249058 A1 | 8/2017 | Fisher et al. | |
| 2019/0114347 A1 | 4/2019 | Johansen | |
| 2019/0243923 A1 | 8/2019 | Kveton et al. | |
| 2020/0311568 A1 | 10/2020 | Xue et al. | |
| 2020/0401634 A1 | 12/2020 | Duan et al. | |
| 2021/0004421 A1 | 1/2021 | Zadorojniy | |
| 2021/0042830 A1 | 2/2021 | Burke | |
| 2022/0150591 A1 | 5/2022 | Miller | |
| 2022/0232282 A1 | 7/2022 | Ramirez | |
| 2022/0309543 A1 | 9/2022 | Kushner et al. | |
| 2022/0405322 A1 | 12/2022 | Rao et al. | |
| 2022/0414754 A1 | 12/2022 | Afshar | |
| 2024/0031616 A1 | 1/2024 | Amir | |
| 2024/0056644 A1 | 2/2024 | Sanghavi et al. | |
| 2024/0064375 A1 | 2/2024 | Sanghavi et al. | |
| 2024/0112041 A1 | 4/2024 | Bambha et al. | |
| 2024/0137621 A1 | 4/2024 | Sanghavi et al. | |
| 2025/0014087 A1 | 1/2025 | Suram et al. | |
| 2025/0024104 A1 | 1/2025 | Sanghavi et al. | |

OTHER PUBLICATIONS

Extended European Search Report directed to related European Patent Application No. 23189817.2, mailed Nov. 20, 2023; 12 pages.

Extended European Search Report directed to related European Patent Application No. 23201055.3, mailed Mar. 28, 2024, 6 pages.

"Reservoir sampling, Wikipedia.org, https://web.archive.org/web/20220205220752/https://en.wikipedia.org/wiki/Reservoirsampling, Feb. 5, 2022 (accessed May 19, 2023 using Wayback Machine), 8 pages".

* cited by examiner

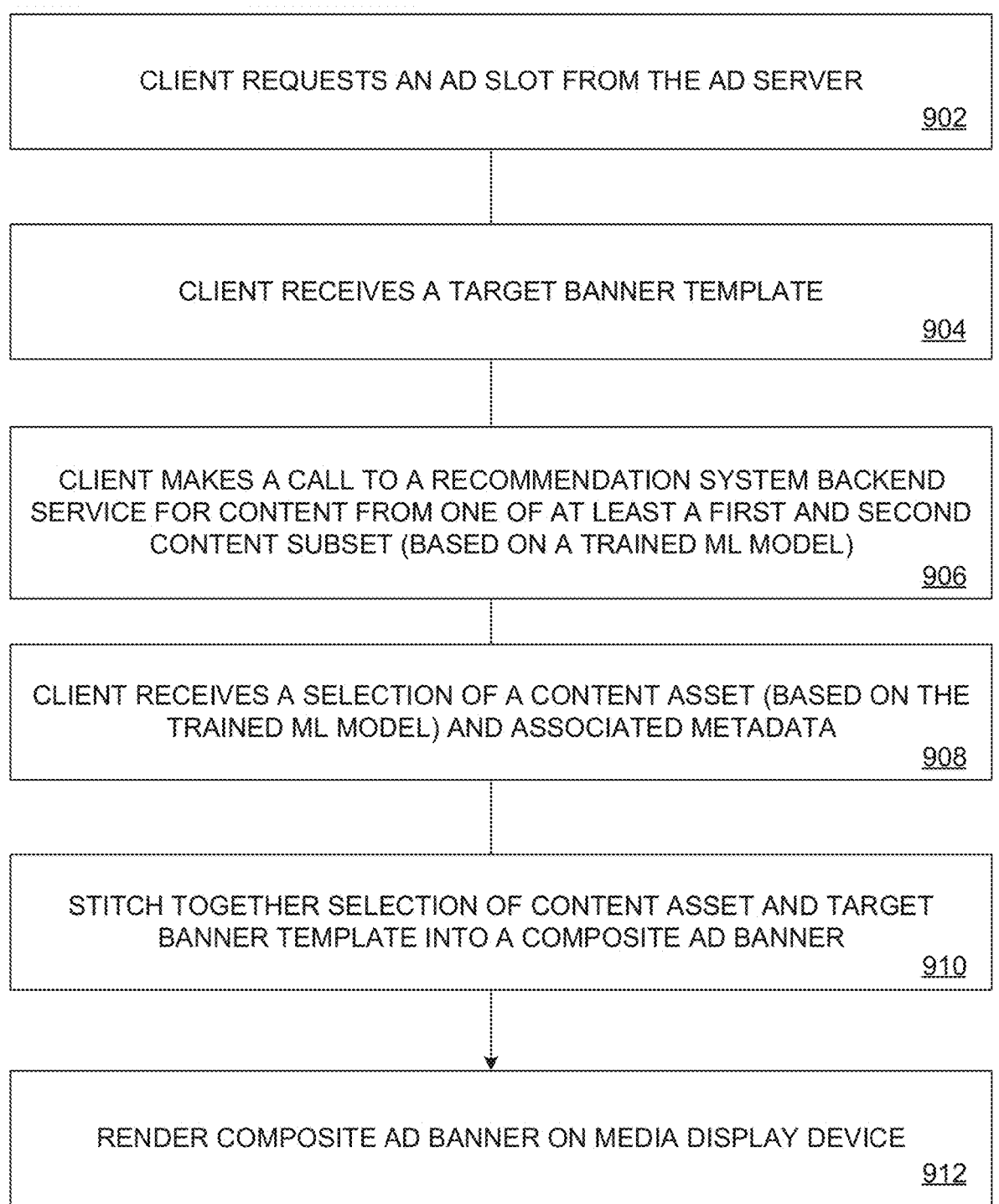

CLIENT REQUESTS AN AD SLOT FROM THE AD SERVER

902

CLIENT RECEIVES A TARGET BANNER TEMPLATE

904

CLIENT MAKES A CALL TO A RECOMMENDATION SYSTEM BACKEND SERVICE FOR CONTENT FROM ONE OF AT LEAST A FIRST AND SECOND CONTENT SUBSET (BASED ON A TRAINED ML MODEL)

906

CLIENT RECEIVES A SELECTION OF A CONTENT ASSET (BASED ON THE TRAINED ML MODEL) AND ASSOCIATED METADATA

908

STITCH TOGETHER SELECTION OF CONTENT ASSET AND TARGET BANNER TEMPLATE INTO A COMPOSITE AD BANNER

910

RENDER COMPOSITE AD BANNER ON MEDIA DISPLAY DEVICE

RENDERING A DYNAMIC ENDEMIC BANNER ON STREAMING PLATFORMS USING CONTENT RECOMMENDATION SYSTEMS AND CONTENT MODELING FOR USER EXPLORATION AND AWARENESS

CROSS-REFERENCE TO RELATED APPLICATIONS

This application is a continuation of U.S. patent application Ser. No. 18/536,627, filed on Dec. 12, 2023, now allowed, which is a continuation of U.S. patent application Ser. No. 17/882,184, filed on Aug. 5, 2022, now U.S. Pat. No. 11,895,372, the contents of which are incorporated herein by reference in its entirety.

BACKGROUND

Field

This disclosure is generally directed to creation of dynamic banners, and more particularly to recommendation systems providing content for personalized banners.

Background

Serving ad content that is personalized to users is not new in the display advertising ecosystem. However, personalization of endemic media on Over-the-Top (OTT) devices has been difficult for several reasons. Endemic advertising works by placing, or allowing another business to place, advertising that appeals directly to the interests of customers. A cooking magazine, for example, makes an effective advertising outlet for companies that make kitchen knives or cookware. Ad media is typically run on awareness or performance optimization basis and in both cases, the targeting selected by the ad server may not translate into an actual content experience for the user, but only a selection of the user for the campaign. The user may be chosen based off one or more targeting attributes that can include viewership data amongst hundreds of other possible signals. But all of that is used to isolate one of many eligible campaigns for the user to see. This approach does not solve the last mile problem of showing content-based creatives that the user is likely to take action on.

SUMMARY

Provided herein are system, apparatus, article of manufacture, method and/or computer program product embodiments, and/or combinations and sub-combinations thereof, for personalized banner generation outside a customer's content affinities. This approach allows an advertisement platform to present content exploration and awareness which brings up content titles outside of what the user would normally see. This content is stitched into personalized endemic banners that run on an advertising platform, which then correspondingly helps drive user reach by creating potentially relevant content outside of their traditional comfort zone. This approach may lead to serendipitous discovery and, in some cases, may lead the user to try out new content genres outside of their comfort zone.

In some embodiments, the system will build upon a banner personalization use-case and target users that are new to the channel partner services. This presents an important campaign tactic for the marketer that can look to broaden the audience profile for their content services.

An example embodiment operates by implementing personalized content banners that may act as a hook for channel users opening their streaming device, both active and lapsed, to enter back into the channel or to enter a new channel.

BRIEF DESCRIPTION OF THE FIGURES

The accompanying drawings are incorporated herein and form a part of the specification.

FIG. 9 illustrates a flow diagram for an exploratory personalized banner system, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for personalized banner generation outside a customer's content affinities. This approach allows an advertisement platform to present content exploration and awareness which brings up content titles outside of what the user would normally see. This content is stitched into personalized endemic banners that run on an advertising platform, which then correspondingly helps drive user reach by creating potentially relevant content outside of their traditional comfort zone. This approach may lead to serendipitous discovery and, in some cases, may lead the user to try out new content genres, channels, or streaming platforms outside of their comfort zone or new to them.

Figure 1:
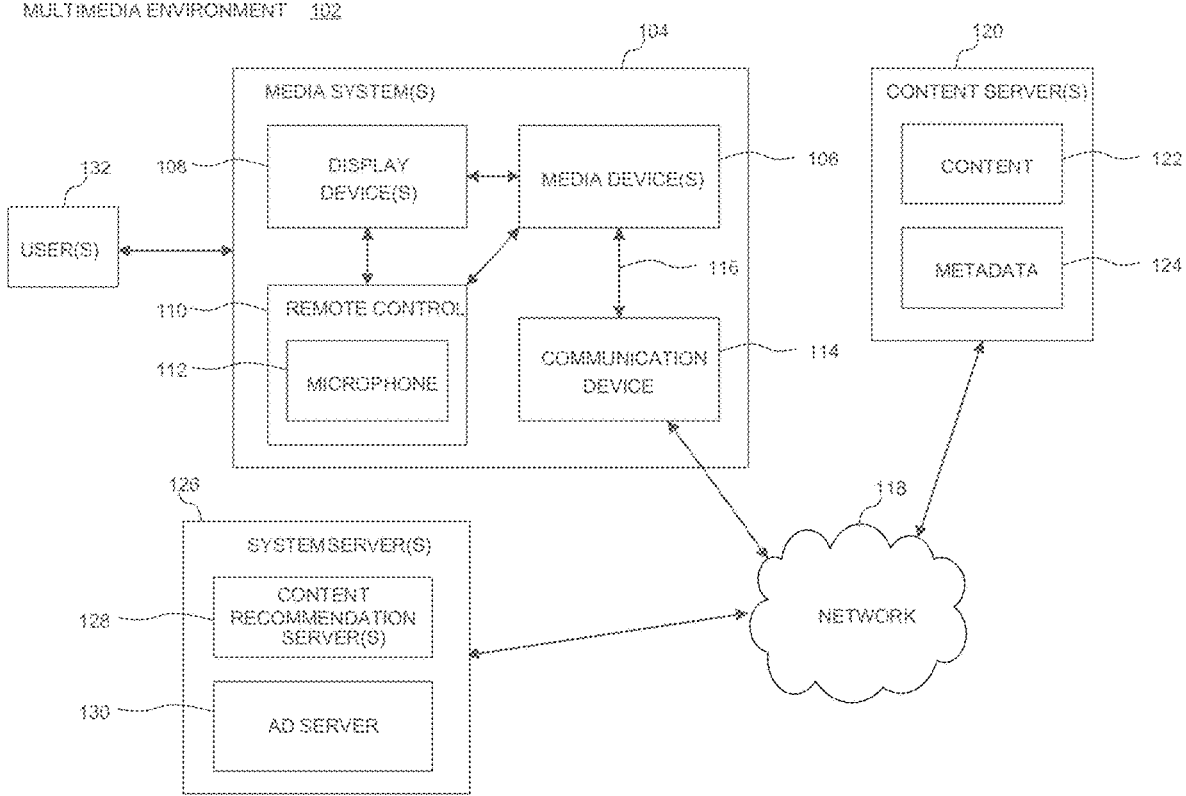
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

The terms "user" and "customer" may be interchangeably used throughout the descriptions that follow.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, character, geographic location, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to advertising embodiments and, thus, the system servers 126 may include one or more advertising servers 130. In some embodiments, the media device 106 may display advertisements in the media system 104, such as on the display device 108.

In addition, using information received from the media devices 106 in the thousands and millions of media systems 104, content recommendation server(s) 128 may identify viewing habits, for example, preferences or likes for different users 132 watching a particular movie. Based on such information, the content recommendation server(s) 128 may determine that users with similar watching habits may be interested in watching similar content.

The system servers 126 may also include an audio server (not shown). In some embodiments, the audio data received by the microphone 112 in the remote control 110 is transferred to the media device 106, which is then forwarded to the system servers 126 to process and analyze the received audio data to recognize the user 132's verbal command. The system servers 126 may then forward the verbal command back to the media device 106 for processing.

Figure 2:
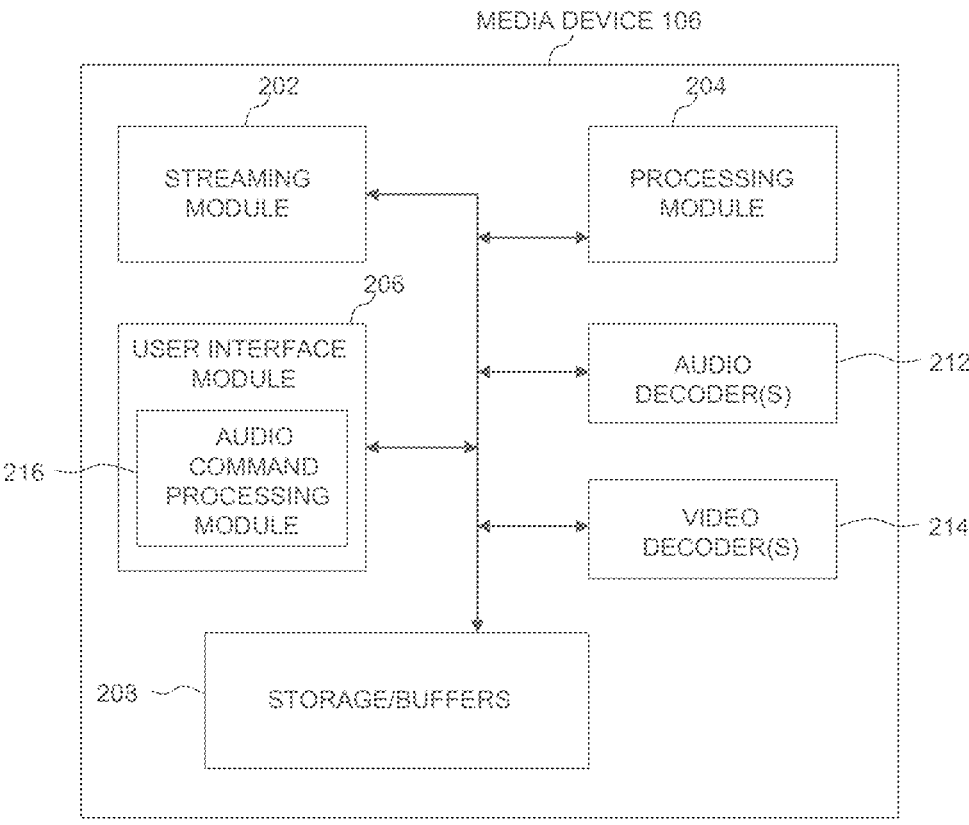
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCPROHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Personalized Banners Based on Content Recommendation Services and Content Exploration Modeling Referring to FIG. 1, the media devices 106 may exist in thousands or millions of media systems 104. Accordingly, the media devices 106 may lend themselves to ad content solution embodiments. In some embodiments, an over-the-top (OTT) media device or service may benefit from the embodiments disclosed herein. An over-the-top (OTT) media service is a media service offered directly to viewers via the Internet. OTT bypasses cable, broadcast, and satellite television platforms; the types of companies that traditionally act as controllers or distributors of such content. The term is most synonymous with subscription-based video-on-demand (SVOD) services that offer access to film and television content (including existing series acquired from other producers, as well as original content produced specifically for the service).

OTT also encompasses a wave of "skinny" television services that offer access to live streams of linear specialty channels, similar to a traditional satellite or cable TV provider, but streamed over the public Internet, rather than a closed, private network with proprietary equipment such as set-top boxes. Over-the-top services are typically accessed via websites on personal computers, as well as via apps on mobile devices (such as smartphones and tablets), digital media players (including video game consoles), or televisions with integrated Smart TV platforms.

In various embodiments, the technology described herein implements a system, apparatus, article of manufacture, method and/or computer program product embodiments, and/or combinations and sub-combinations thereof, for utilizing a content recommendation system (RecSys) powering a publisher channel to enhance an ad creative being shown to the user via exploration, awareness or performance campaigns. This method allows the platform to present the exploratory ML in-channel content to the publisher platform users in endemic banners that run on the platform which then correspondingly helps drive user reach.

A content recommender system, or a content recommendation system, is a subclass of information filtering system that seeks to predict the "rating" or "preference" a user would give to an item. The embodiments described herein may use any content recommendation system, algorithm or models without departing from the scope of the technology described herein. A few commonly used systems will be described hereafter, but other approaches, including future approaches may be interchanged herein without departing from the scope of the technology described.

Content recommendation systems are used in a variety of areas, with commonly recognized examples taking the form of playlist generators for movies, series, documentaries, podcasts, music services, and product recommendations, to name a few. In some embodiments, the playlist may be instantiated as a series of visual tiles displaying a sample image of the content or selectable movie trailer. The tiles may be arranged by some selected ordering system (e.g., popularity) and may be arranged in groups or categories, such as "trending", "top 10", "newly added", "sports", "action", etc.

One approach to the design of recommender systems that has wide use is collaborative filtering. Collaborative filtering is based on the assumption that people who agreed in the past will agree in the future, and that they will like similar kinds of items as they liked in the past. The system generates recommendations using only information about rating profiles for different users or items. By locating peer users/items with a rating history similar to the current user or item, they generate recommendations using this neighborhood. Collaborative filtering methods are classified as memory-based and model-based. A well-known example of memory-based approaches is the user-based algorithm, while that of model-based approaches is the Kernel-Mapping Recommender.

A key advantage of the collaborative filtering approach is that it does not rely on machine analyzable content and therefore it is capable of accurately recommending complex items such as movies without requiring an "understanding" of the item itself. Many algorithms have been used in measuring user similarity or item similarity in recommender systems. When building a model from a user's behavior, a distinction is often made between explicit and implicit forms of data collection. An example of explicit data collection may include asking a user to rate an item. While examples of implicit data collection may include observing the items that a user views, analyzing item/user viewing times, keeping a record of content items that a user purchases, or building a list of items that a user has watched on one or more streaming platforms.

Another common approach when designing recommender systems is content-based filtering. Content-based filtering methods are based on a description of the item and a profile of the user's preferences. These methods are best suited to situations where there is known data on an item (name, location, description, etc.), but not on the user. Content-based recommenders treat recommendation as a user-specific classification problem and learn a classifier for the user's likes and dislikes based on an item's features.

In this system, keywords are used to describe the items, and a user profile is built to indicate the type of item this user likes. In other words, these algorithms try to recommend items similar to those that a user liked in the past or is examining in the present. It does not rely on a user sign-in mechanism to generate this often temporary profile. In particular, various candidate items are compared with items previously rated by the user, and the best-matching items are recommended.

Basically, these various methods use an item profile (i.e., a set of discrete attributes and features) characterizing the item within the system. To abstract the features of the items in the system, an item presentation algorithm is applied. A widely used algorithm is the tf-idf representation (also called vector space representation). The system creates a content-based profile of users based on a weighted vector of item features. The weights denote the importance of each feature to the user and can be computed from individually rated content vectors using a variety of techniques. Simple approaches use the average values of the rated item vector while other sophisticated methods use machine learning techniques such as Bayesian Classifiers, cluster analysis, decision trees, and artificial neural networks in order to estimate the probability that the user is going to like the item.

Content-based recommender systems can also include opinion-based recommender systems. In some cases, users are allowed to leave movie reviews or feedback on the items. Features extracted from the user-generated reviews may improve meta-data of content items. Sentiments extracted from the reviews can be seen as users' rating scores on the corresponding features. Common approaches of opinion-based recommender systems utilize various techniques including machine learning, sentiment analysis and deep learning.

Figure 3:
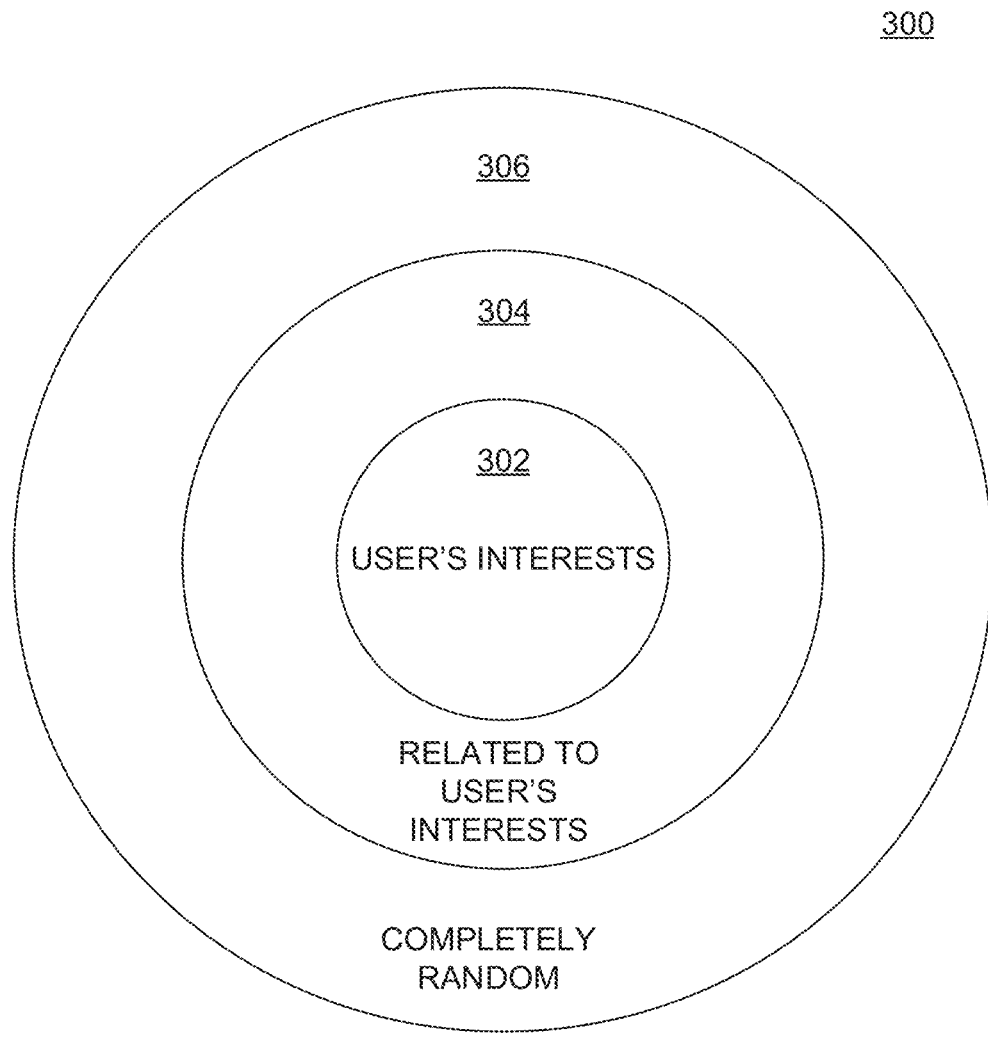
FIG. 3 illustrates an example diagram of an exploration strategy for a personalized banner system, according to some embodiments.
Figure 6:
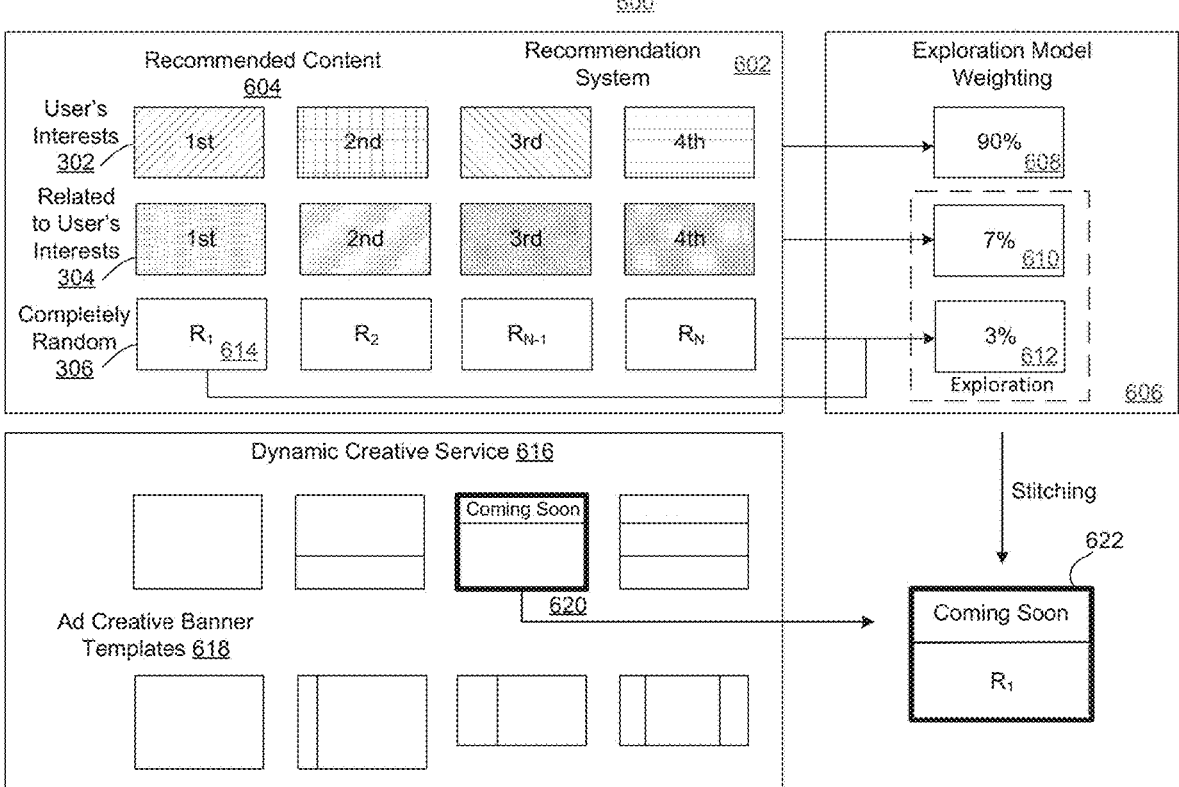
FIG. 6 illustrates another example diagram of an exploratory personalized banner system, according to some embodiments.

FIG. 3 illustrates an example diagram of an exploratory strategy for a personalized banner system, according to some embodiments. FIG. 6 illustrates a non-limiting example of dynamically created exploratory banners for an OTT system. This example should not limit the scope of the technology described herein as it is limited to a high level illustration of one or more parts of the overall system and processes. While illustrated as separate functional blocks, one or more of these blocks may be operational in various parts of the system. For example, one or more components described for generating exploratory ad banners may be performed in the content recommendation servers 128, the ad server 130, the content servers 120, the media system 104, other cloud based systems or any combination thereof.

As shown, FIG. 3 illustrates an example diagram of an exploratory banner diagram 300, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

Exploratory banner diagram 300 may be implemented with a recommendation system, for example, the content recommendation server(s) 128 of FIG. 1. Alternatively, or in addition to, one or more components of the recommendation system may be implemented within the media system 104, by third party platforms, a cloud-based system or distributed across multiple computer-based systems. Exploratory banner diagram 300 may be implemented with a dynamic creative service as will be shown in FIGS. 6 and 7.

One objective of content recommendation systems, such as those previously described herein, is to optimize the likelihood of a user selecting an advertising banner to switch to content as recommended in the personalized banner. However, these approaches may limit selection of content, content channels or content providers outside of a customer's content affinities. In exemplary embodiments, an exploratory approach allows an advertisement platform to present content exploration and awareness which brings up content titles outside of what the user would normally see. This content is stitched into personalized endemic banners that run on an advertising platform, which then correspondingly helps drive user reach by creating potentially relevant content outside of their traditional comfort zone. This approach may lead to serendipitous discovery and, in some cases, may lead the user to try out new content genres, channels, or streaming platforms outside of their comfort zone.

As shown, a user's typical comfort zone includes user's interests zone 302. This content is specifically chosen by the content recommendation system as the user has shown an affinity to this content based on a user profile, historical selections, historical actions, like rating a movie, etc. While following this approach may provide a high ad banner selection rate by the customer, it may prevent the customer from being exposed to content located outside of this comfort zone. More specifically, the user's interests zone 302 may only include a small subset of all available content. In some embodiments, a second subset of available content may include additional content related to the user's interests zone 304, but exclude the content in the user's interests zone 302. Content related to a user's interests may be based on other user's popular searches, current events, analogous content, and any other content that a user may not have historically shown an affinity towards, but rather may be characterized as a weak link.

As shown, in the outside ring, a subset of content exists that a user has shown no affinity towards and therefore may be categorized as a completely random zone 306. This zone is defined a completely random as no connection to the user is used to select any content asset in this subset. This zone contains all content not provided in zones 302 or 304 and may include a significantly large body of content that would normally not be recommended to user by stitching in a personalized content banner. For example, for a customer that has no history for a content affinity to sports, sports movies may be categorized (for this customer) within the completely random zone 306. While various embodiments described herein may select one or more content items from this zone as part of an exploratory strategy model, content that a user has shown an avoidance to may also be categorized in this zone. A user may have indicated that content showing violence, mature themes, to name a few, should be avoided. To prevent accidental random selection of these content assets using the exploratory model described herein, in some embodiments, this content is deactivated from the content recommendation system.

Figure 4:
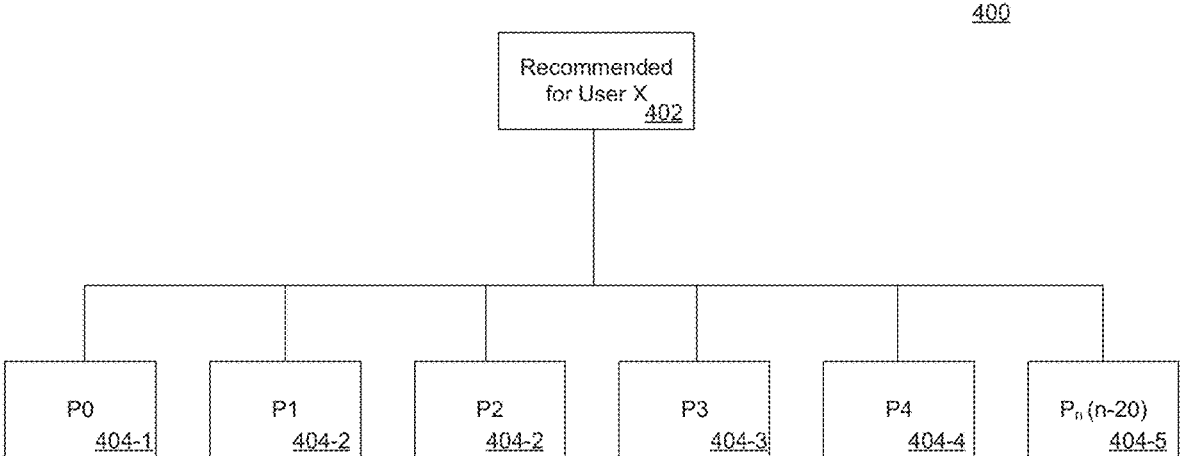
FIG. 4 illustrates an example diagram of an exploratory and awareness personalized banner recommendation, according to some embodiments.

FIG. 4 illustrates an example diagram of an exploration and awareness personalized banner recommendation 400, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

In some embodiments, an exploration and awareness personalized banner recommendation 400 may randomly drive user value by helping them find the most relevant and highly personalized content title in an app, channel, or platform that they have not previously subscribed to (e.g., zone 304), or are not currently active with (e.g., zone 306). For example, a user X primarily streams sitcom comedies on Channel Y, such as "TV show A". User X has no awareness about other similar sitcom comedies available on other channels and apps that are a part of a current streaming platform. Based on user signals, e.g., a search live channel history, and training models based on content via which users who became active after being inactive for X days or completely new (user-cold-start), the recommendation system generates top N (e.g., 20) recommendations for each user at any time. Recommendation P0 is the most relevant and has the highest probability to drive user plays, whereas Pn has the lowest probability. The recommendation system serves recommendations P0 to Pn in a randomized sequence for exploration of new content for users.

In some embodiments, the recommendation system (RecSys) may generate recommendations via collaborative filtering with knowledge that the users who have behaviors similar to user X, would enjoy sitcom comedy and as a result the recommendations system recommends TV Show B on Channel Y to this user via a personalized banner ad. The user clicks on the ads and discovers a new series to watch that matches their interests. The marketer was able to successfully acquire a new user for Channel Y by recommending personalized and engaging content titles.

Example #1

A user X is inactive on Channel Z, but may watch live feeds, such as live TV channels. The recommendation system may have limited signal information about user X, for example, as they may be limited to their search and live feed history. As will be described in greater detail in FIG. 8 (e.g., exploratory model 818), the recommendation system will generate recommendations for user X (402) by training an exploratory model 818 with the examples of inactive users that become active in Channel Z via title popularity and diversity signals. Using this methodology, the recommendation system may generate some number of titles (404-1 thru 404-5 ($P_n$ (n–20)), for example, 20 titles for every user at a given time. To help serendipitous discovery of new content for users, the sequence in which the recommendation system prioritizes the 20 recommendations will be randomized. Instead of serving the best title, i.e., 1 out of 20, RecS may show 15th or 18th or 20th instead of showing 1st to 20th sequentially. This random selection process may assist the recommendation system get signals on the actual or new preferences of the user amongst the top 20 items recommended, while helping drive serendipitous discovery and exploration of new content.

Example #2

A user X primarily streams sitcom comedies on Channel Q, say they stream "TV show B". User X has no awareness comedies available on other channels and apps that are a part of the streaming platform. The recommendation system, via collaborative filtering, has knowledge that the users who have behaviors like user X, would enjoy sitcom comedy and as a result the recommendations system recommends 'TV Show G" on Channel L to this user via a personalized banner ad. The user clicks on the ad and discovers a new series to watch that matches their interests. The marketer was able to successfully acquire a new user for Channel L by recommending personalized and engaging content titles.

The recommendations system predicts the most the relevant and personalized content title for every user via collaborative filtering, popularity and diversity rules while applying randomized sequencing after the top X (say 20) recommendations are generated. This method helps to drive acquisition of new users for a streaming channel, content providers and Direct To Consumer (DTC) apps. The randomized test design assists in extracting actual preferences of the user to further train the models.

Serendipitous discovery of relevant, engaging and personalized new content titles solves a technical problem with popularity or preference based recommendation systems, limited content applicability, as the users can watch on a streaming platform, content distribution service, provider content or DTC apps.

Figure 5:
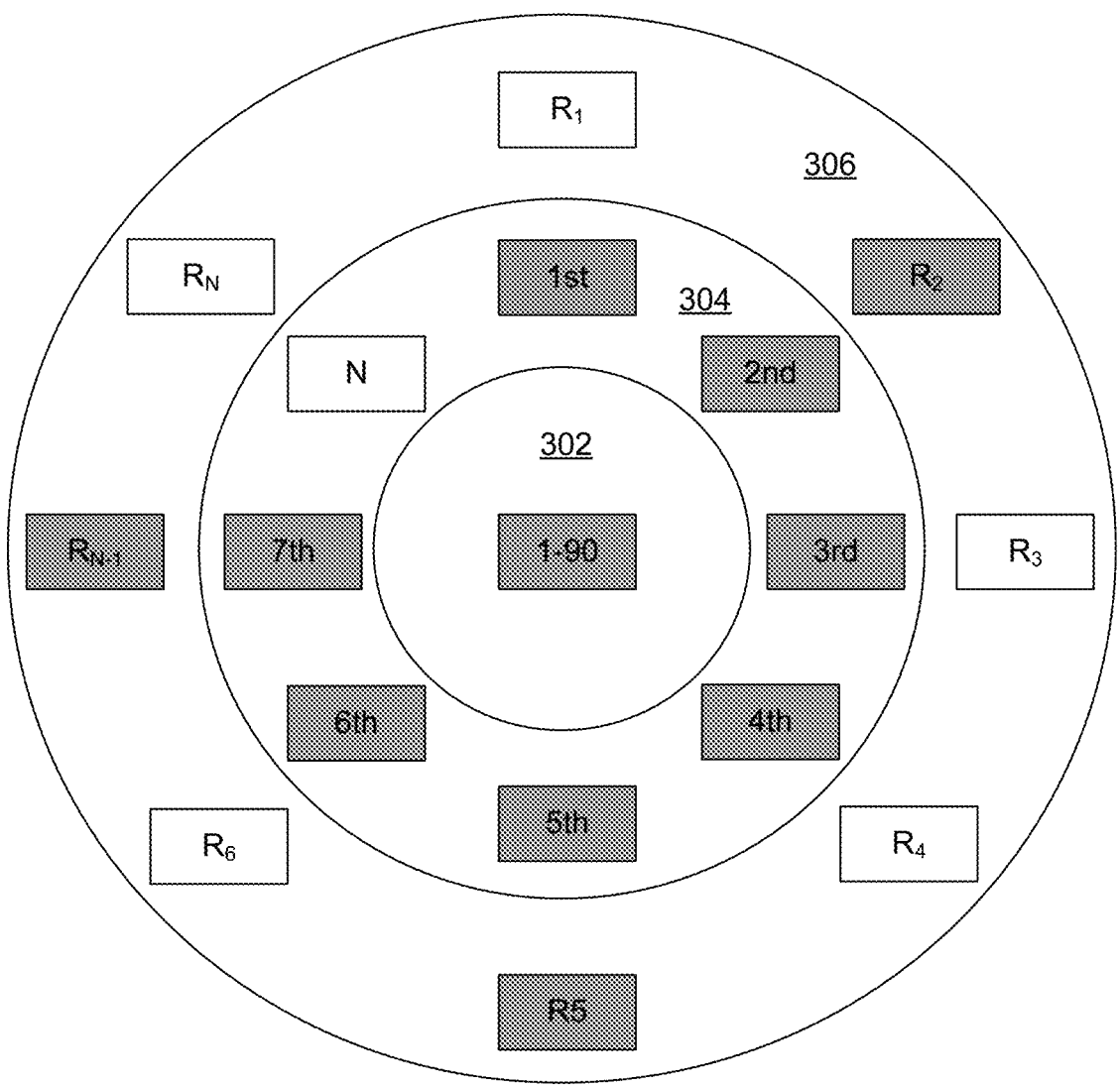
FIG. 5 illustrates another example diagram of an exploratory personalized banner recommendation, according to some embodiments.

FIG. 5 illustrates another example diagram of an exploratory personalized banner recommendation, according to some embodiments.

In some embodiments, a hybrid approach may provide the benefits of a focused user's interests recommendation system with the exploration benefits of a less focused approach. While described for three levels of content affinity (zones 302, 304 and 306), any number of levels may be designated without departing from the scope of the technology described herein. As shown, a number of content recommendations for personalized banners will be selected from a user's typical comfort zone (i.e., the center circle), such as previously described user's interests zone 302. This content is specifically chosen by the content recommendation system as the user has shown an affinity to this content based on a user profile, historical selections, historical actions, like rating a movie, etc. In addition, a second subset of additional content related to the user's interests zone 304, but excluding the 302 zone content, may be selected for recommendation. And lastly, from the outside ring, a third subset of content that a user has shown no affinity towards is selected from completely random zone 306. This zone contains all content not provided in zones 302 or 304 and may include a significantly large body of content that would normally not be recommended to user by stitching in a personalized content banner.

However, an effective exploratory strategy of selecting content from one or more zones of content, may be challenging. For example, as shown, using a 90/7/3 rule for each one hundred recommended content selections, the recommendation system could select ninety content recommendations from the user's comfort zone-user's interests zone 302, select seven from content related to the user's interests zone 304 and three from the completely random zone 306. In addition, any number of algorithmic selection processes may be instantiated for content selection or ordering within each zone. For example, in zone 302, the most popular current content may be selected, the highest rated current content, the content most closely matching user preferences of historical interactions, or in zone 306, random selection, to name a few. Therefore, as will described in greater detail in FIG. 8, a machine learning model may be trained by looking at a specific recommendation strategy and subsequent user actions. For example, using the 90/7/3 strategy, produces a 5% customer selection rate of banner ads with exploratory content. In addition, in some embodiments, the training data may be customized to specific types or combinations of content. For example, a specific recommendation strategy may provide different results based on user preferences or content. In a non-limiting example, a user who frequently watches sports, may have a higher affinity for selecting content outside of their comfort zone than a user who historically watches horror movies.

While shown for illustrative purposes as a 90/7/3 exploration model, any percentage of selections for each of a multiplicity of zones with differing content affinity (e.g., from high to none) may be substituted herein without departing from the scope herein.

FIG. 6 illustrates an example diagram of an exploratory personalized banner system, according to some embodiments. Exploratory personalized banner system 600 may be implemented with recommendation system 602. Recommendation system 602 may be configured with content recommendation server 128 to recommend one or more content assets 604 from one or more content affinity zones (302, 304 or 306). Alternatively, or in addition to, one or more components of the recommendation system 602 may be implemented within the media system 104, by third party platforms, a cloud-based system or distributed across multiple computer-based systems. As shown, exploratory personalized banner system 600 may be implemented with a dynamic creative service 616.

In some embodiments, dynamic creative service 616 may be configured with ad server 130. Alternatively, or in addition to, one or more components of the dynamic creative service 616 may be implemented within the media system 104, by third party platforms, a cloud-based system or distributed across multiple computer-based systems. Dynamic creative service 616 may be configured with a plurality of possible advertising banner samples (i.e., templates) or may be configured as a dynamic banner generator (customized content, sizing, colors, graphics, arrangement, etc.). For example, the dynamic banner generator may position artwork elements differently from a standard template arrangement.

In an exploratory personalized example embodiment, customer specific related content based on a user's interests zone 302 is selected 90% (608) of the time. User's interests 302 content assets may include metadata that may be directly related to the user, for example, as demographic data (e.g., generation group, location, etc.) or declared preferences. Alternatively, or in addition to, the metadata may be collected by recommendation system 602 by observation of user behaviors (content selected, content rejected, frequency of specific actors in selected content, frequency of specific characters in selected content, character types commonly found in selected content, etc.). Content affinity may be characterized by an ordered list of content assets, with a highly occurring or user liked content assets at the top of the ordered list and the next highest occurring or next liked aspect following in the listing order and so on. Alternatively, or in addition to, the content assets of user's interests 302 may be arranged in ordered groups, such as, but not limited to, characters, actors, genres, new shows, old shows, location specific (set in Los Angeles), decades, popularity, to name a few. User's interests are not limited to positive preferences, as negative responses may also be valuable to avoid content that the specific customer does not want to see (e.g., violent, specific content ratings, specific characters or actors, etc.). Other arrangements of user preferences delineated by associated metadata would be understood by one skilled in the art and may be interchanged without departing from the scope of the technology described herein.

Exploration Model Weighting 606 may be implemented to generate possible content assets recommendations from different subsets of available content assets. Presentation of user's interests 302 content assets in a personalized banner may results in a high probability of user selection of ads displaying this content. The recommendation system 602 may implement an exploration strategy using the balance of 10% of content recommendations to present banners to the user with different content assets to those identified by the user's interests to stimulate exploration and new content awareness. This exploratory personalized content related to User's interests 304, selected 7% of the time (610), or completely random content assets 306, and selected 3% (612) of the time may also be arranged in an advertising banner. In a non-limiting example, to grow an audience, the creative team may generate a banner ad template 618 with the hook "coming soon" 620 or similar phrasing that suggests the content will soon to be available. A selected recommended content asset, $R_1$ (completely random content asset number 1-614), will be stitched into a creative art template or be inserted into a dynamically prepared ad banner.

In some embodiments, for the same recommended content 614 and ad template 618, the system may generate one of many different banner combinations. In one non-limiting example, the recommended content 614 may include identifying metadata associated therewith. For example, the selected completely random recommended content 614 is "TV show H. In some embodiments, this metadata may provide assistance when selecting a creative to insert (stitch) the selected content asset 614 into. Alternatively or in addition to, the metadata may provide a pointer to related content assets directly or indirectly as they relate to the primary content asset that may be added to the selected content asset and added to the banner.

The additional, but distinctly separate embodiments can create virtually thousands, if not millions of banner artwork combinations, providing a level of personalization never before seen on any platform, let alone OTT platforms. This exploratory personalization improves the current computer-based process of banner selection and solves one or more known problems with connecting with target customers at a level of personalization and exploration not reached by current systems.

As shown, recommendation system 602 would generate possible selections for each content affinity zone (302, 304 and 306) of available streaming content that will be appearing soon on, for example, soon to be available on a streaming platform and order them (shown as 4 tiles) based, for example, on user's interests, related user's interests, or completely randomly. Related user's interests may be generated, for example, by determining if a specific customer likes Actor A, identified by Metadata 1, the system could search for additional actors that commonly appear with Actor A and substitute the corresponding metadata as common metadata. Another aspect may be substituting popularity or trending factors as similar metadata. For example, Actor A is in the primary content metadata selected by the recommendation system 602, but this actor is not explicitly preferred by the user in their user profile, however, as they are very popular or are trending, content assets of this actor are generated for possible selection from zone 304.

The exploratory personalized banner system 600 would identify related advertising campaigns as well as identifying exploratory content that would complement or improve these campaigns. For example, "$R_1$" 614 reflects an exploratory content asset and has associated with it one or more metadata data fields. Dynamic creative service 616 may use any template or dynamic banner generation technique to insert (e.g., stitch) the exploratory personalized content asset 614 into an advertising banner. As shown, a creative advertising banner or dynamic banner is selected to introduce an upcoming TV show to soon be available on a streaming service or platform. Exploratory personalized content 614 "$R_1$" is sized and stitched into the ad banner template to form a composite ad banner 622.

Figure 7:
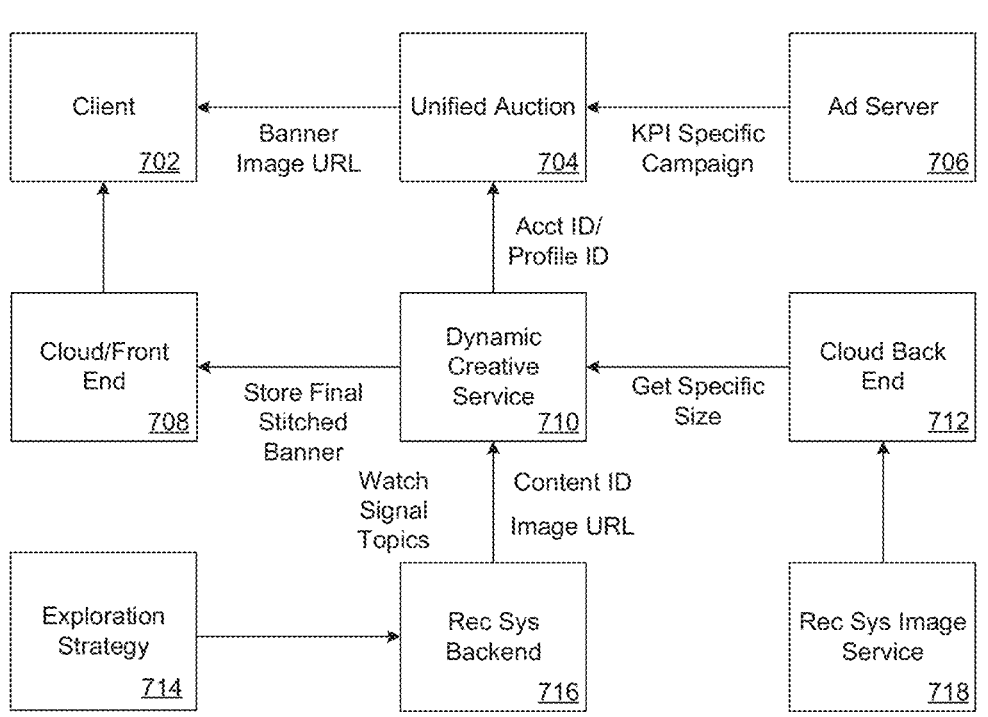
FIG. 7 illustrates a block diagram of an exploratory personalized banner system with exploration, according to some embodiments.

FIG. 7 illustrates another example diagram of an exploratory personalized banner system 700, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 7, as will be understood by a person of ordinary skill in the art.

Ad server 706 may be configured as a service that places advertisements on digital platforms. For example, ad serving technology companies provide advertisers a platform to serve ads, count them, choose the ads that will make the most money, and monitor the progress of different advertising campaigns. An ad server may be implemented as a Web server (e.g., ad server 130) that stores advertising content used in online marketing and delivers that content onto various digital platforms such as television, streaming devices, smartphones, tablets, laptops, etc. An ad server may be configured to store the advertising material and distribute that material into appropriate advertising slots. One purpose of an ad server is to deliver ads to users, to manage the advertising space, and, in the case of third-party ad servers, to provide an independent counting and tracking system for advertisers/marketers. Ad servers may also act as a system in which advertisers can count clicks/impressions in order to generate reports, which helps to determine the return on investment for an advertisement on a particular media streaming platform.

Unified auction 704 brings together a plurality of possible ad campaigns meeting various KPIs for selection. In one non-limiting example, pay-per-click (PPC) is an internet advertising model used to drive traffic to content streaming platforms, in which an advertiser pays a publisher when the ad is clicked (i.e., selected). Advertisers typically bid, in a unified auction 804, on content or keywords relevant to their target market and pay when ads are clicked. Alternatively, or in addition to, content sites may charge a fixed price per click rather than use a bidding system. PPC display advertisements, also known as banner ads, are shown on streaming platforms with related content that have agreed to show ads and are typically not pay-per-click advertising, but instead usually charge on a cost per thousand impressions (CPM). The amount advertisers pay depends on the publisher may be driven by two major factors: quality of the ad, and the maximum bid the advertiser is willing to pay per click measured against its competitors' bids. In general, the higher the quality of the ad, the lower the cost per click is charged and vice versa.

As previously described, recommendation system (RecSys) backend 716 (same as 602) may be configured with content recommendation server 128. Alternatively, or in addition to, one or more components of the recommendation system backend 716 may be implemented within the media system 104, by third party platforms, a cloud-based system or distributed across multiple computer-based systems. Recommendation system backend 716 may be configured to predict the "rating" or "preference" a user would give to an item. The embodiments described herein may use any content recommendation system, algorithm or models without departing from the scope of the technology described herein. A few commonly used systems will be described hereafter, but other approaches, including future approaches may be interchanged herein without departing from the scope of the technology described.

Dynamic Creative Service 710 is configured to visually combine one or more content recommendation representations (e.g., image, video, text, etc.) into a selected ad banner. An image stitcher may resize, change one or more colors, or add or remove one or more segments to the content representation while integrating it into a banner template (See FIG. 6). The completed banner may be stored locally or in the cloud front end system 708 for delivery to the client 702. In some embodiments, the stitcher functionality may be performed on the client. For example, the client can, in real-time, generate the banner that the user would see on their screens.

Client 702, for example, media system 104, may pull from the unified auction 804 or call the completed stitched banner template from cloud front end system 708 to be displayed on the client device (e.g., display device 108). For example, the banner may be displayed on a same graphics window that renders a plurality of streaming channels. The streaming channels may, in one approach, be arranged as a series of content tiles and ordered or not ordered. For example, a series of streaming channels may be organized by genre and display a series of tiles in a descending order of popularity. The stitched banner may be prominently displayed to attract the attention of the user to a specific available content selection on one or more of the channels. Images may be retrieved by cloud backend 712 from an image service, such as RecSys Image Service 718.

As previously described, RecSys backend 716, in various embodiments, may provide recommended content with associated metadata to be included with or as a source of content for exploratory personalized content. The exploratory personalized content may be determined based on an ML exploration model as part of an exploration strategy 714.

Figure 8:
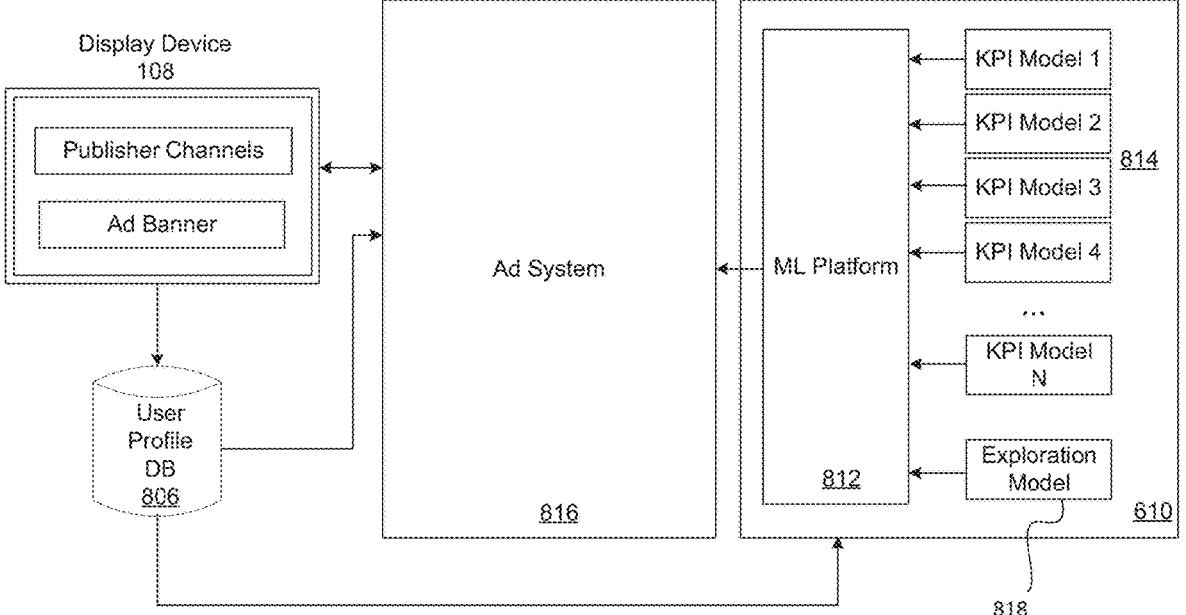
FIG. 8 illustrates another block diagram of an exploratory personalized banner system with exploration, according to some embodiments.

FIG. 8 illustrates another block diagram of an exploratory personalized banner system with exploration, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 8, as will be understood by a person of ordinary skill in the art.

Recommendation System Backend 716 and Exploration strategy 714 may be implemented with a machine learning platform 812. Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so.

For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine learning engine may use various classifiers to map concepts associated with a specific content structure to capture relationships between concepts (e.g., watch signal topics) and the content. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify content watch patterns and associated future content selections within varying content structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of content recognition, a dataset of movies and genre matches may be used.

In some embodiments, machine learning models are trained with other customer's historical information (e.g., watch history). In addition, large training sets of the other customer's historical information may be used to normalize prediction data (e.g., not skewed by a single or few occurrences of a data artifact). Thereafter, the predictive models may classify a specific user's historic watch data based on positive (e.g., movie selections, frequency of watching, etc.) or negative labels (e.g., no longer watching, etc.) against the trained predictive model to predict preferences and generate or enhance a previous profile. In one embodiment, the customer specific profile is continuously updated as new watch instances from this customer occur.

In an exemplary embodiment, the recommendation system predicts the most the relevant and personalized content title for every user via collaborative filtering, popularity and diversity rules while applying predicting additional exploratory content assets, such as randomized sequencing after the top X (say 20) recommendations are generated. The exploratory content assists in extracting actual preferences of the user to further train the models. For example, the exploration model 818 may be trained to adjust weighting (% or frequency of selections) of zone 302, 304 and 306 recommendations until the model can predict an exploration success rate (user selects exploratory content ad) above a selected threshold. For example, when using the previously described 90/7/3 selection model, a user selects the exploration ad 4% of the time. If the threshold is 5%, than the percentages of each zone selection are modified until the threshold is met.

Serendipitous discovery of relevant, engaging and personalized new content titles solves a technical problem with popularity or preference based recommendation systems, limited content applicability, as the users can watch on a streaming platform, content distribution service, provider content or DTC apps.

As shown, a series of desired KPI models 814, 1-N, may be fed into the ML Platform 812 as a second axis parameter to predict a KPI model that may be satisfied by a set of predicted user's upcoming content selections. In some embodiments, an output of the ML Platform 812 is a matrix of possible content choices based on matching a predicted KPI specific ad campaign to predicted user content selections. The ad system 816 may include, but is not limited to, the ad server 706, unified auction 704 and dynamic creative service 710 components previously described.

A booking ad campaign may be for a target KPI that a marketer is anticipating as the outcome by running the media. The KPI here can be (1) open app, (2) execute a first time view, (3) establish a qualified streaming session (1, 5, 15, minutes or more), (4) signup or subscribe to the service, (5) resume watching of targeted content, (6) complete watching a targeted/sponsorship program, etc.

A target Cost Per Ad (CPA) is subsequently calculated for the expected action. Depending on the KPI desired, the marketer can provide a range of pricing choices that can be used depending on the user and the target action. The pricing and the qualified action along with the propensity for the user to perform said action may play a role in determining whether this ad impression with personalized content is shown to the user.

For example, if the ad campaign is seeking users who should meet a qualified streaming session, then the marketer may assign a theme or content category taxonomy facet such as 'new this month', trending now, popular, watch next etc. Each of these categories will correspond to one or more content tiles that are selected as recommended for the user. The recommendation service that runs in the background for the target channel will offer a ranked list of content tiles specifically for this user by content category. In an alternative embodiment, a marketer may also elect to just pick 'the best content signal' that is free of any content category selection and is anticipating that the RecSys system has a top ranked content selection to offer for this user.

User profile DB 806 may provide user profile information that may be used with the Ad system 816 to provide account and profile information based on associated identifiers (IDs). Additionally, as specific ad campaigns are presented to the user, for example, as ad banners are rendered on their display device 108, the historical information may be added to the user's profile and stored in the User Profile DB 806.

FIG. 9 is a flow chart depicting an exploratory personalized banner system method that can be carried out in line with the discussion above. One or more of the operations in the method depicted by FIG. 9 could be carried out by one or more entities, including, without limitation, system server 126, media system 104 or content server 120, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some embodiments, the systems described generate and render dynamic banners on streaming platforms.

In 902, a streaming media device platform device (client) implements an ad request for an ad slot for a user (based on their user profile) which is sent to an ad server along with user profile information and subsequently receives, in 904, from an ad system, a target banner template. In some embodiments, the target banner template is selected based on any of, opening an application (App), executing a first-time view, subscribing to a service, resumption of watching targeted content, completion of watching targeted content, or completion of watching a sponsorship program.

In 906, based on a trained machine learning model, the streaming media device platform implements one or more calls to a recommendation system backend service for recommended content. As previously described, the content assets may be selected based on the trained ML model (e.g., exploration model) weighting subsets of content assets to meet a threshold of target banner selections by a customer that include exploratory content. A number of content recommendations for personalized target banners will be selected from a user's typical comfort zone (first subset), such as previously described user's interests zone 302. This content is specifically chosen by the content recommendation system as the user has shown an affinity to this content based on a user profile, historical selections, historical actions, like rating a movie, etc. In addition, a second subset of additional content related to the user's interests zone 304, but excluding the 302 zone content, may be selected for recommendation. And lastly, a third subset of content that a user has shown no affinity towards is selected from completely random zone 306. This zone contains all content not provided in zones 302 or 304 and may include a significantly large body of content that would normally not be recommended to user by stitching in a personalized target banner.

In 908, the streaming media device platform receives, based on the trained machine learning model (e.g., exploration model), a selection of a recommended content asset. The recommended content asset includes at least a link to the content asset and metadata.

In 910, the streaming media device platform aggregates the recommended content asset selection and the target banner template. While described as a single step, the target banner template and the recommended content asset may be received and stored in computing memory of the streaming media device platform independently at various points in the sequence without departing from the scope of the technology described herein. For example, the target banner template could be received and stored post the ad slot request, the recommended content asset received and stored post the first call and the one or more of the selected content assets received and stored post closest matching. A stitcher then 'assembles' the creative that is a fully composite banner that the streaming media device platform renders, in 912, on a media display device (e.g., client device screen). The stitcher service may be located on the media system, streaming platform, media device, system servers, content servers, third party platforms, a cloud-based system, or distributed across multiple computer-based systems without departing from the scope of the technology disclosed herein.

The solution described above marries several key technical components that are lacking in the current personalization aspect of ad-served media. It takes in one or more levels of content based matching to generate preferred and exploratory personalized ad banners. By doing this, the advertising may be perceived as wholly organic and native by creating a natural extension of the user experience/user interface to include ad placements for the user. The various embodiments solve the technical problem of making advertising endemic for OTT data streaming platforms.

Example Computer System

Figure 10:
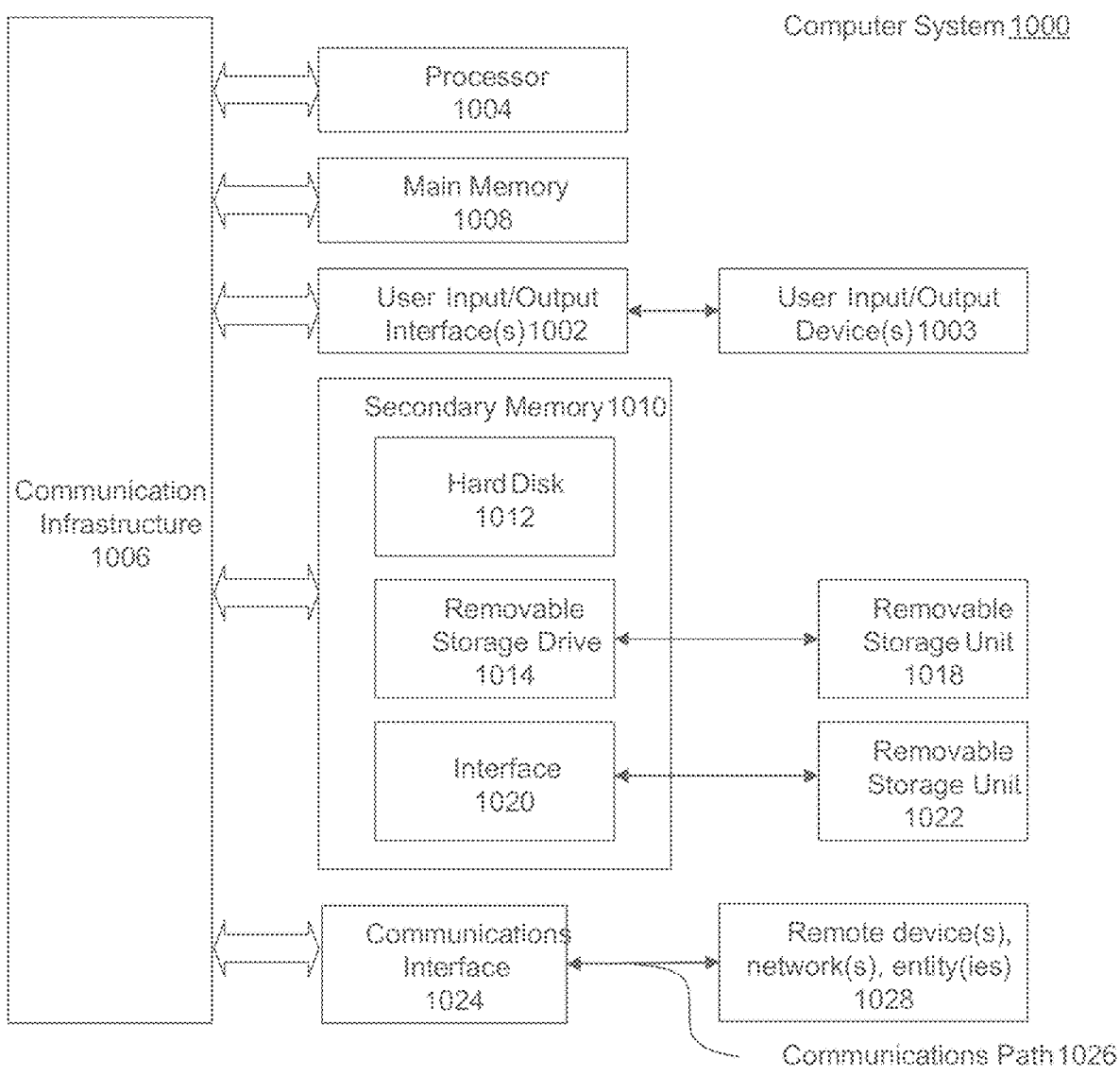
FIG. 10 illustrates an example computer system useful for implementing various embodiments.

Various embodiments may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for creating dynamic banners, the method comprising:

generating, by at least one computer processor and based on a trained machine learning model, a first call to a content recommendation system for a first subset of content assets for a target banner template, wherein the first subset of content assets includes a first number of content selections reflecting interests of a user;

generating, based on the trained machine learning model, a second call to the content recommendation system for a second subset of content assets for the target banner template, wherein the second subset of content assets includes a second number of content selections related to the interests of the user and differs from the first subset of content assets, wherein the trained machine learning model is trained to weight content asset subset generation based on the target banner template, including at least the second subset of the content assets being selected by the user at a frequency above a threshold value;

generating, based on the trained machine learning model, a third call to the content recommendation system for a third subset of content assets for the target banner template, wherein the third subset of the content assets includes a third number of content selections unrelated to the interests of the user and absent from either the first subset or the second subset of content assets;

determining, based on the first number, the second number, and the third number, a collective number of the first subset of content assets, the second subset of content assets, and the third subset of content assets;

selecting, based on an exploration strategy, a specific content asset from the collective number of the content assets, wherein the exploration strategy selects the specific content asset based on a frequency of occurrence of each of the first number, the second number, and the third number relative to the collective number;

receiving, at a media device, the specific content asset;

stitching the specific content asset into the target banner template to form a composite banner; and rendering the composite banner on a display of the media device.

2. The method of claim 1, wherein the composite banner comprises an endemic banner.

3. The method of claim 1, wherein the media device comprises an Over-the-Top (OTT) device.

4. The method of claim 1, wherein the first subset of content assets comprises content most closely matching historical interactions of the user.

5. The method of claim 1, wherein the first subset of content assets comprises popular current content.

6. The method of claim 1, wherein the first subset of content assets comprises highest rated current content.

7. The method of claim 1, wherein the trained machine learning model comprises an exploratory component to select the third subset of content assets.

8. The method of claim 1, wherein the target banner template is selected based on any of:

opening an application (App);

executing a first-time view;

subscribing to a service;

resumption of watching targeted content;

completion of watching targeted content; or completion of watching a sponsorship program.

9. A system, comprising:

a memory; and at least one processor coupled to the memory and configured to perform operations comprising:

generating, based on a trained machine learning model, a first call to a content recommendation system for a first subset of content assets for a target banner template, wherein the first subset of content assets includes a first number of content selections reflecting interests of a user;

generating, based on the trained machine learning model, a second call to the content recommendation system for a second subset of content assets for the target banner template, wherein the second subset of content assets includes a second number of content selections related to the interests of the user and differs from the first subset of content assets, wherein the trained machine learning model is trained to weight content asset subset generation based on the target banner template, including at least the second subset of the content assets being selected by the user at a frequency above a threshold value;

generating, based on the trained machine learning model, a third call to the content recommendation system for a third subset of content assets for the target banner template, wherein the third subset of the content assets includes a third number of content selections unrelated to the interests of the user and absent from either the first subset or the second subset of content assets;

determining, based on the first number, the second number, and the third number, a collective number of the first subset of content assets, the second subset of content assets, and the third subset of content assets;

selecting, based on an exploration strategy, a specific content asset from the collective number of the content assets, wherein the exploration strategy selects the specific content asset based on a frequency of occurrence of each of the first number, the second number, and the third number relative to the collective number;

receiving, at a media device, the specific content asset;

stitching the specific content asset into the target banner template to form a composite banner; and rendering the composite banner on a display of the media device.

10. The system of claim 9, where the composite banner comprises an endemic banner.

11. The system of claim 9, where the system comprises a streaming media device platform for an Over-the-Top (OTT) device.

12. The system of claim 9, wherein the first subset of content assets comprises content most closely matching historical interactions of the user.

13. The system of claim 9, wherein the first subset of content assets comprises popular current content.

14. The system of claim 9, wherein the first subset of content assets comprises highest rated current content.

15. The system of claim 9, wherein the trained machine learning model comprises an exploratory component to select the third subset of content assets.

16. A non-transitory computer-readable medium having instructions stored thereon that, when executed by at least one computing device, cause the at least one computing device to perform operations comprising:

generating, based on a trained machine learning model, a first call to a content recommendation system for a first subset of content assets for a target banner template, wherein the first subset of content assets includes a first number of content selections reflecting interests of a user;

generating, based on the trained machine learning model, a second call to the content recommendation system for a second subset of content assets for the target banner template, wherein the second subset of content assets includes a second number of content selections related to the interests of the user and differs from the first subset of content assets, wherein the trained machine learning model is trained to weight content asset subset generation based on the target banner template, including at least the second subset of the content assets being selected by the user at a frequency above a threshold value;

generating, based on the trained machine learning model, a third call to the content recommendation system for a third subset of content assets for the target banner template, wherein the third subset of the content assets includes a third number of content selections unrelated to the interests of the user and absent from either the first subset or the second subset of content assets;

determining, based on the first number, the second number, and the third number, a collective number of the first subset of content assets, the second subset of content assets, and the third subset of content assets;

selecting, based on an exploration strategy, a specific content asset from the collective number of the content assets, wherein the exploration strategy selects the specific content asset based on a frequency of occurrence of each of the first number, the second number, and the third number relative to the collective number;

receiving, at a media device, the specific content asset;

stitching the specific content asset into the target banner template to form a composite banner; and rendering the composite banner on a display of the media device.

17. The non-transitory computer-readable medium of claim 16, wherein the composite banner comprises an endemic banner and the at least one computing device comprises an Over-the-Top (OTT) device.

18. The non-transitory computer-readable medium of claim 16, wherein the trained machine learning model comprises an exploratory component to select the third subset of content assets.

19. The non-transitory computer-readable medium of claim 16, wherein the first subset of content assets comprises content most closely matching historical interactions of the user.

20. The non-transitory computer-readable medium of claim 16, wherein the first subset of content assets comprises popular or highest rated current content.

* * * * *